United States Patent [19]

Meyerhoefer et al.

[11] Patent Number: 4,944,003

[45] Date of Patent: Jul. 24, 1990

[54] SOLID STATE TELEPHONE PROTECTOR MODULE

[75] Inventors: Carl Meyerhoefer, Dix Hills; Helmuth Neuwirth, Garden City; Peter Visconti, Baldwin, all of N.Y.

[73] Assignee: Porta Systems Corp., Syosset, N.Y.

[21] Appl. No.: 413,689

[22] Filed: Sep. 28, 1989

[51] Int. Cl.[5] .............................................. H02H 3/22

[52] U.S. Cl. .................................. 379/412; 361/119; 361/124

[58] Field of Search ................ 379/412; 361/117, 118, 361/119, 124, 56, 392, 394

[56] References Cited

U.S. PATENT DOCUMENTS

| | | | |
|---|---|---|---|
| 4,796,150 | 1/1989 | Dickey et al. | 361/119 |
| 4,856,060 | 8/1989 | Meyerhoefer et al. | 361/119 |

*Primary Examiner*—Jin F. Ng
*Assistant Examiner*—Jhancy Augustus
*Attorney, Agent, or Firm*—Charles E. Temko

[57] ABSTRACT

An individual subscriber circuit protector module employing solid state circuitry for protection against momentary voltage surges, and having firmly sensitive heat coil assemblies for protecting against continuous excess current surges. Fail-safe protection is also provided which becomes operative in the event of failure of the heat coil protection.

3 Claims, 5 Drawing Sheets

SOLID STATE TELEPHONE PROTECTOR MODULE

BACKGROUND OF THE INVENTION

This invention relates generally to the field of telephony, and more particularly to an improved solid state protector module for individual subscriber circuits normally engaged with a telephone protector block in a telephone company central office. Devices of this general type are known in the art, and the invention lies in specific constructional details which permit improved ease of manufacture and assembly, and the availability of fail-safe operation in the event of failure of the principal heat-sensitive protector element.

While traditionally, protective modules of the instant type have been equipped with so-called carbon arc devices which serve to short excess current and voltage surges on the protected line to a source of ground potential, because of improved economies in manufacture, such devices have been almost uniformly replaced by units offering either gas tube or solid state protective elements. Generally, gas tubes had been more popular, principally because they are cheaper to manufacture. However, solid state protector devices are particularly useful in protecting circuits connected to solid state office equipment, because of greater sensitivity and faster reaction time.

As with all protector modules, the principal protective element serves to ground momentary current surges of excess voltage, and since such protective devices are destroyed when subjected to substained excess current loads, it is usual to provide a heat-sensitive secondary protective means which responds to heat generated within the module during such sustained current overload.

In the case of solid state protective modules, the momentary surge protector element is usually manufactured as an integrated circuit chip which is encased within a synthetic resinous enclosure having electrically conductive leads projecting therefrom and communicating with tip, ring, and ground connections. During overload, the enclosure will overheat, and in some cases, actually melt. However, the destruction of the integrated circuit chip may occur in such manner that a shorting to ground may not always occur. Where additional heat coil protection is provided, such elements are also subject to failure. There thus arises the need of a fail-safe grounding means operated by the heat generated within the housing of the module which will assure such grounding operation.

SUMMARY OF THE INVENTION

Briefly stated, the invention contemplates the provision of an improved subscriber circuit protector module of solid state type in which fail-safe secondary or tertiary protective means is incorporated. To this end, the device comprises an outer housing of standard configuration enclosing both the solid state integrated circuit and secondary and tertiary protection means. The integrated solid state device is supported within the module housing by engaging a recess in one end of the module which comprises a base element and an engageable shell element. Positioned within the module between the integrated chip element and conventional heat coil assemblies is a resilient failsafe contact having resilient members the free ends of which are surrounded by a sleeve of fusable material, the melting of which effects a grounding function independently of operation of the heat coil assemblies. The device is configured that the components thereof may be readily assembled by workers having only ordinary skills, and without the use of other than ordinary tools.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 4:
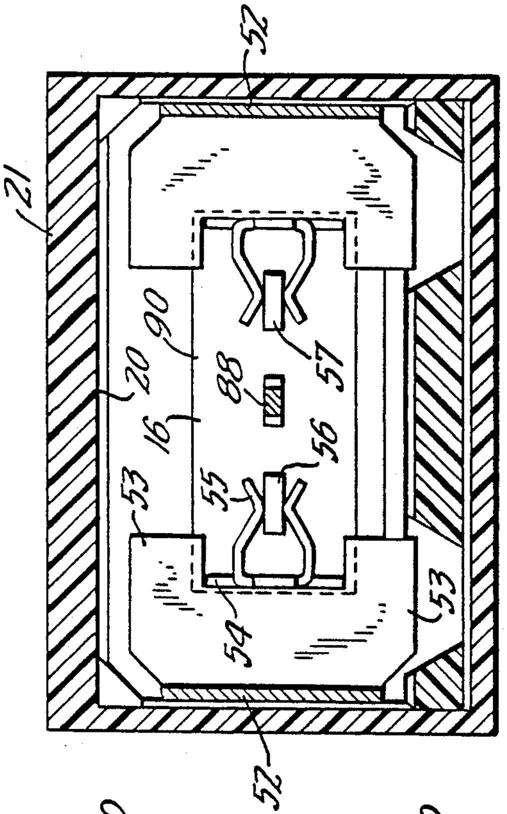
FIG. 4 is a transverse sectional view thereof as seen from the plane 4—4 in FIG. 2.

In accordance with the invention, the device, generally indicated by reference character 10, comprised broadly: a housing element 11, a pair of test point contact elements 12, a fail-safe contact element 13, a pair of long contact elements 14, a ground contact element 15, a solid state chip element 16, and a pair of heat coil assemblies 17.

The housing element 11 is of molded synthetic resinous construction and includes a base element 20 and a shell element 21 engageable therewith.

The base element 20 forms a thickened end wall for the element 21 and is bounded by an outer end surface 23, an inner end surface 24, an upper surface 25, a lower surface 26 and first and second side surfaces 27 and 28. Bores 29, 30, 31, 32 and 33 anchor the usual tip in, tip out, ring in, ring out pins, some of which are indicated by reference characters 38, and a centrally positioned ground pin 34, all of which engage corresponding openings in a connector block (not shown). Locking tabs 35 project laterally from the upper and lower surfaces 25 and 26. A recess 36 supports the chip element 16 when the device is assembled, and a recess 37 cooperates with index means on the above-mentioned connector block.

The shell element 21 (FIGS. 12–16) includes an upper wall 40, a lower wall 41, side walls 42 and 43 and an outer end wall 44 which supports a manually-engageable handle 45. An opening 46 at an opposite end accommodates the base element 20, the walls 40 and 41 providing openings 47 which engage the tabs 35 to hold the housing in assembled condition. The wall 44 is also provided with optional openings 48 for access by test probes to the test point contact element 12.

Figure 6:
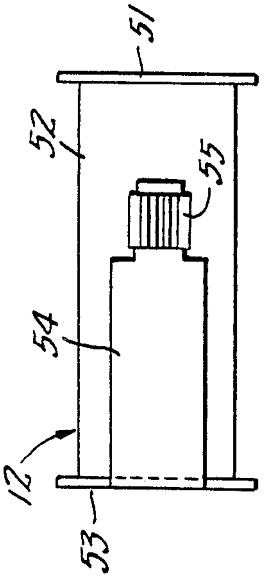
FIG. 6 is a top plan view thereof.
Figure 7:
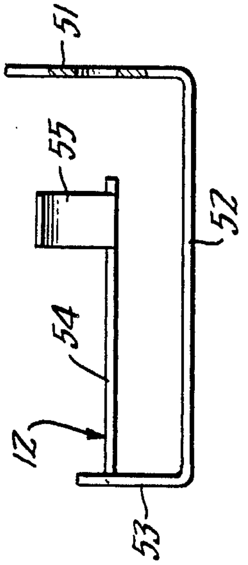
FIG. 7 is a second end elevational view thereof.
Figure 5:
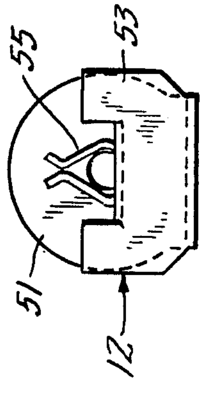
FIG. 5 is an end elevational view of a test point contact forming part of the embodiment.
Figure 8:
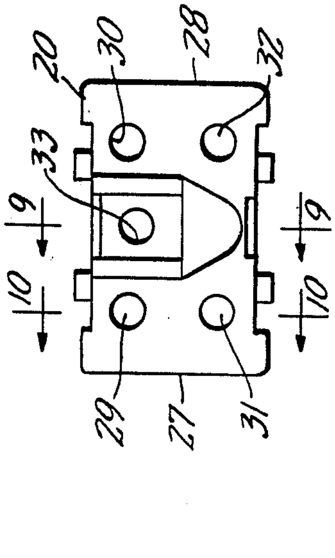
FIG. 8 is an end elevational view of a base element forming part of an outer housing.
Figure 9:
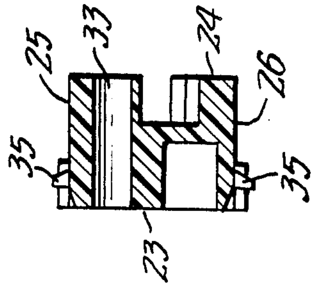
FIG. 9 is a longitudinal sectional view as seen from the plane 9—9 in FIG. 8.
Figure 10:
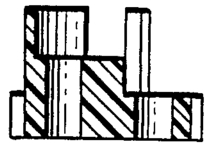
FIG. 10 is a longitudinal sectional view as seen from the plane 10—10 in FIG. 8.
Figure 11:
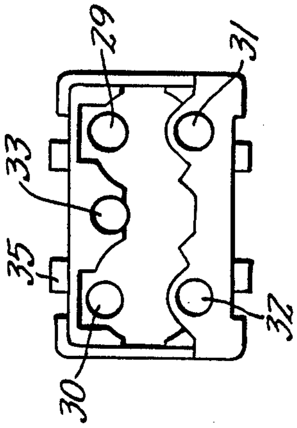
FIG. 11 is an end elevational view showing the end opposite that seen in FIG. 8.
Figures 12, 13, 14, 15, 16, 17, 18, 19:
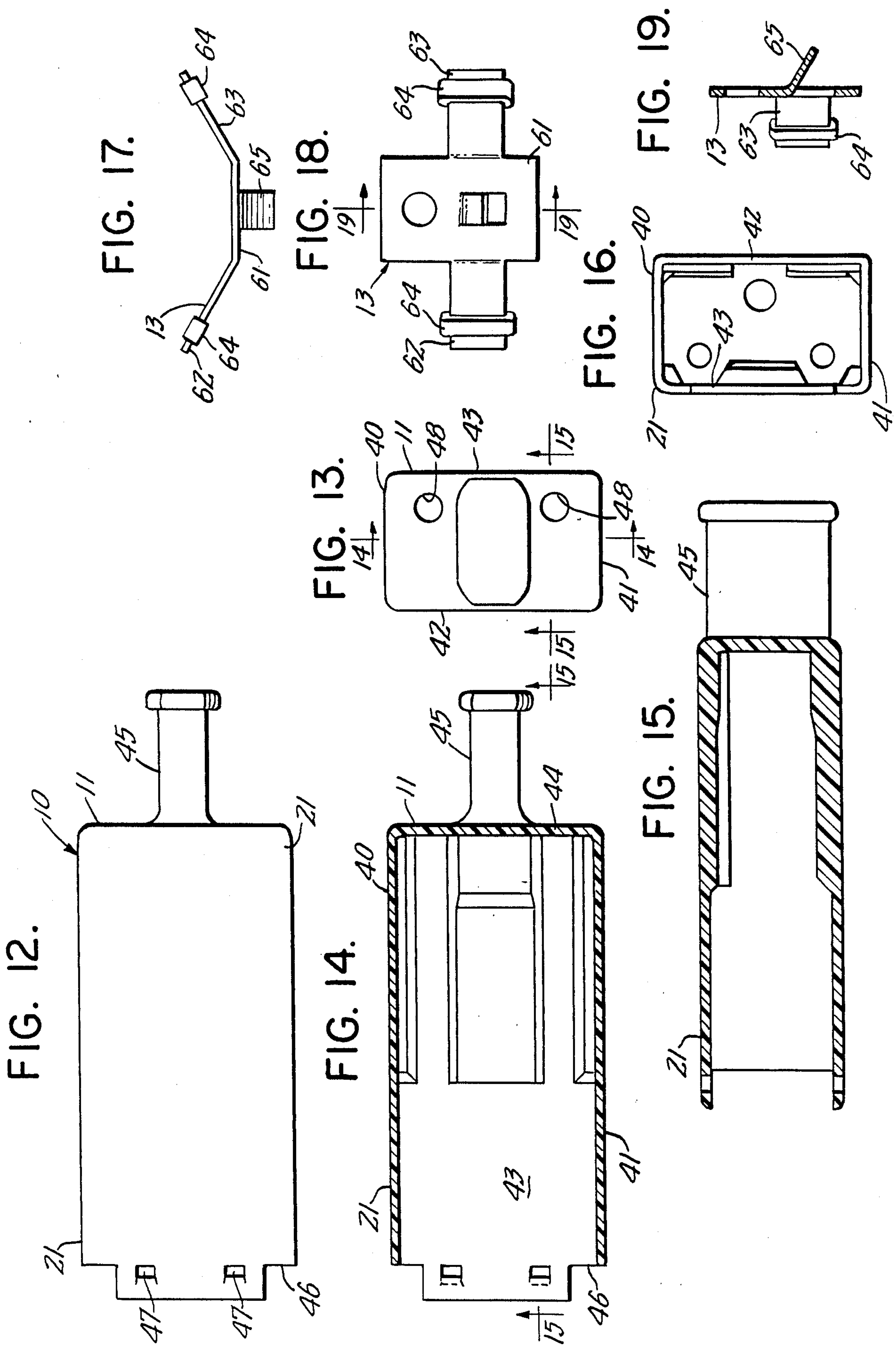
FIG. 12 is a top plan view of a shell element forming part of an outer housing.
FIG. 13 is an end elevational view thereof as seen from the right-hand portion of FIG. 12.
FIG. 14 is a longitudinal sectional view as seen from the plane 14—14 in FIG. 13.
FIG. 15 is a longitudinal sectional view as seen from the plane 15—15 in FIG. 13.
FIG. 16 is an end elevational view as seen from the left-hand portion of FIG. 14.
FIG. 17 is a top plan view of a fail-safe contact element.
FIG. 18 is an end elevational view of the fail-safe contact element.
FIG. 19 is a side elevational view as seen from the left-hand portion of FIG. 15.

The test point contact elements 12 (FIGS. 5–7) are formed as metallic stampings from copper alloys known in the art, and include a first end wall 51, a lower wall 52, a second end wall 53, and an upper wall 54 terminating in clamp contacts 55 which engage a tip or ring terminal 56-57 on the chip element 16.

The fail-safe contact 13 ( FIGS. 17–19) provides grounding protection, as has been mentioned, in the event of failure of the heat coil assemblies 17. It is also in the form of a metallic stamping, and includes an end wall 61, from which extend first and second resilient members 62 and 63 each having a fusable sleeve 64 surrounding the free end thereof. A contact tab 65 extends longitudinally in an opposite direction. The wall 61 also includes an opening 66 which accommodates the inner end of the ground pin 34.

Figure 20:
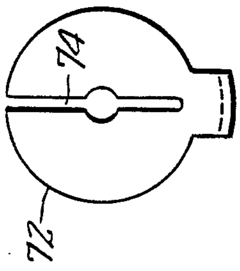
FIG. 20 is an end elevational view of a long contact interconnecting external contact pins.
Figure 21:
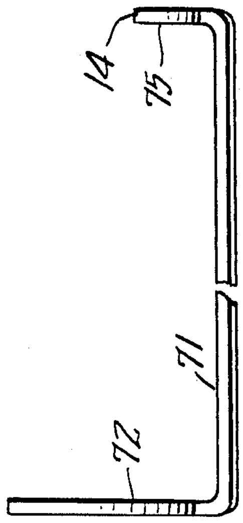
FIG. 21 is a fragmentary side elevational view thereof.
Figure 22:
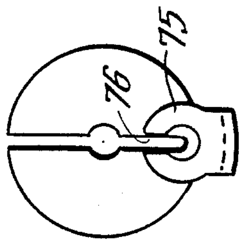
FIG. 22 is a second end elevational view thereof.
Figure 23:
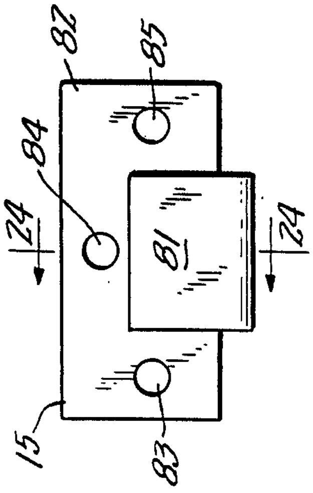
FIG. 23 is an end elevational view of a ground contact.
Figure 24:
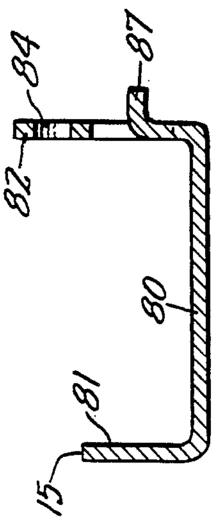
FIG. 24 is a side elevational view of the ground contact.
Figure 25:
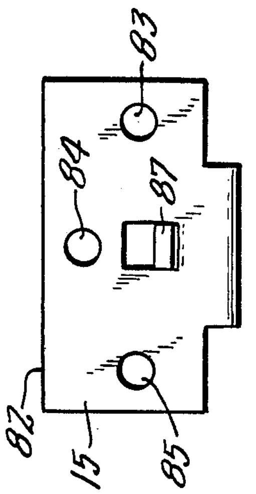
FIG. 25 is a second end elevational view of the ground contact.

The long contact elements 14 (FIGS. 20–22) are of conventional configuration, each including an elongated segment 71, a first larger terminal 72 having a slotted opening 74, and a second smaller terminal 75 having a slotted element 76.

The ground contact element 15, again a metallic stamping, includes a longitudinally extending segment 80, an angled terminal member 81, and a ground plane member 82 having first, second and third orifices 83, 84 and 85. A longitudinally extending tab 87 contacts a flat conductor 88 communicating with the chip element 16.

The chip element 16 is a type known in the art, and may be one currently obtainable under the trademark Ticcor. An integrated circuit chip (not shown) is molded within a synthetic resinous enclosure 90, from which extend chip and ring leads 56 and 57 and a ground lead 93.

Likewise, the heat coil assemblies 17 are also of known type, each including a heat coil spring 106 and a grounding pin unit 102 and heat coil 103. The ends of the pin unit 102 are adapted to penetrate openings 83 and 85 of the ground contact element 15 upon actuation. The spring 106 includes a lateral extension 107 at one end thereof adapted to contact one of the pins 38.

Figure 1:
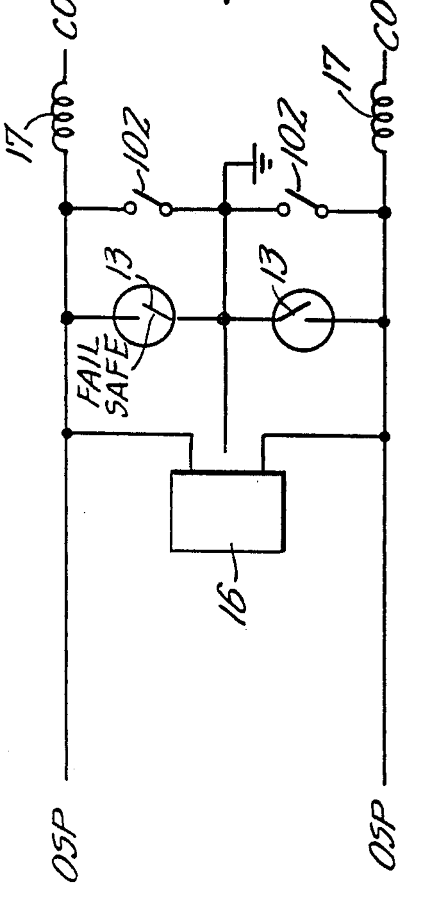
FIG. 1 is an electrical schematic diagram of an embodiment of the invention.

Referring to FIG. 1, conductivity of the above-described components will be apparent. The subscriber side of the circuit is indicated by reference characters OSP, and the central office side of the circuit is indicated by reference characters CO.

In use, the solid state chip provides protection for the solid state components of the circuit by providing momentary grounding upon the occurrence of surges which will damage these components. The heat coil assemblies provide the normal function of forming a continuous ground of currents which are of a substantial voltage and amperage sufficient to melt the fusible components thereof. Should for any reason the heat coil assemblies fail to function, the heat generated within the module by the excess current flow will melt the flangible sleeves 64 on the fail-safe contact element 13 to provide an equivalent grounding function.

Figure 3:
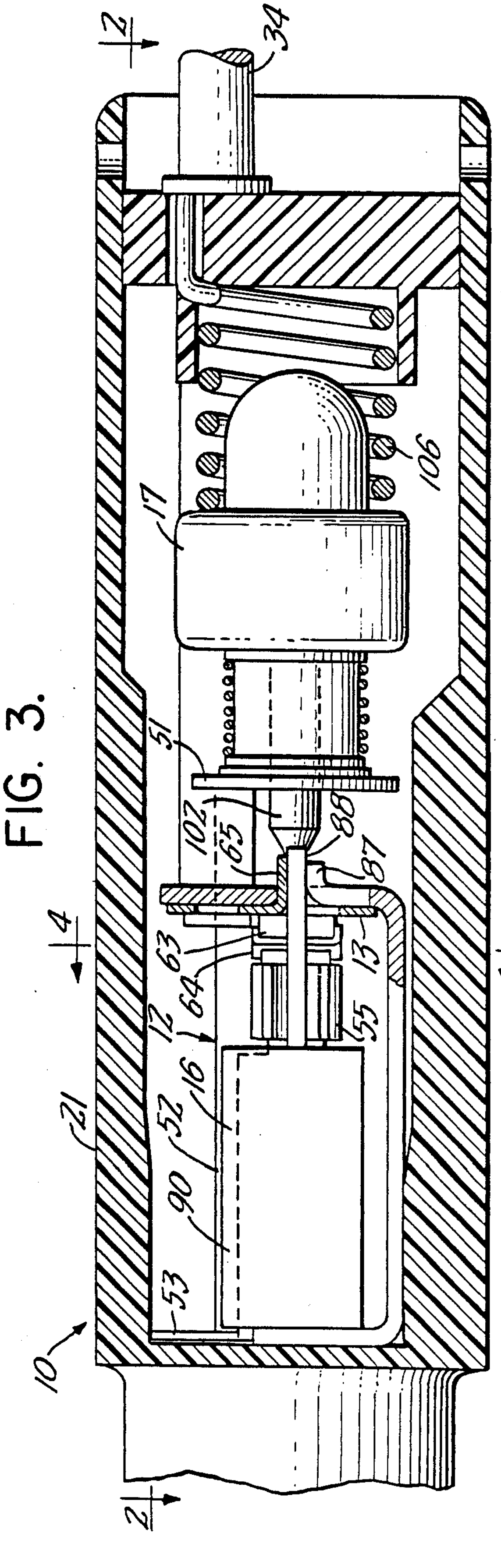
FIG. 3 is a fragmentary longitudinal sectional view thereof as seen from the plane 3—3 in FIG. 2.
Figure 2:
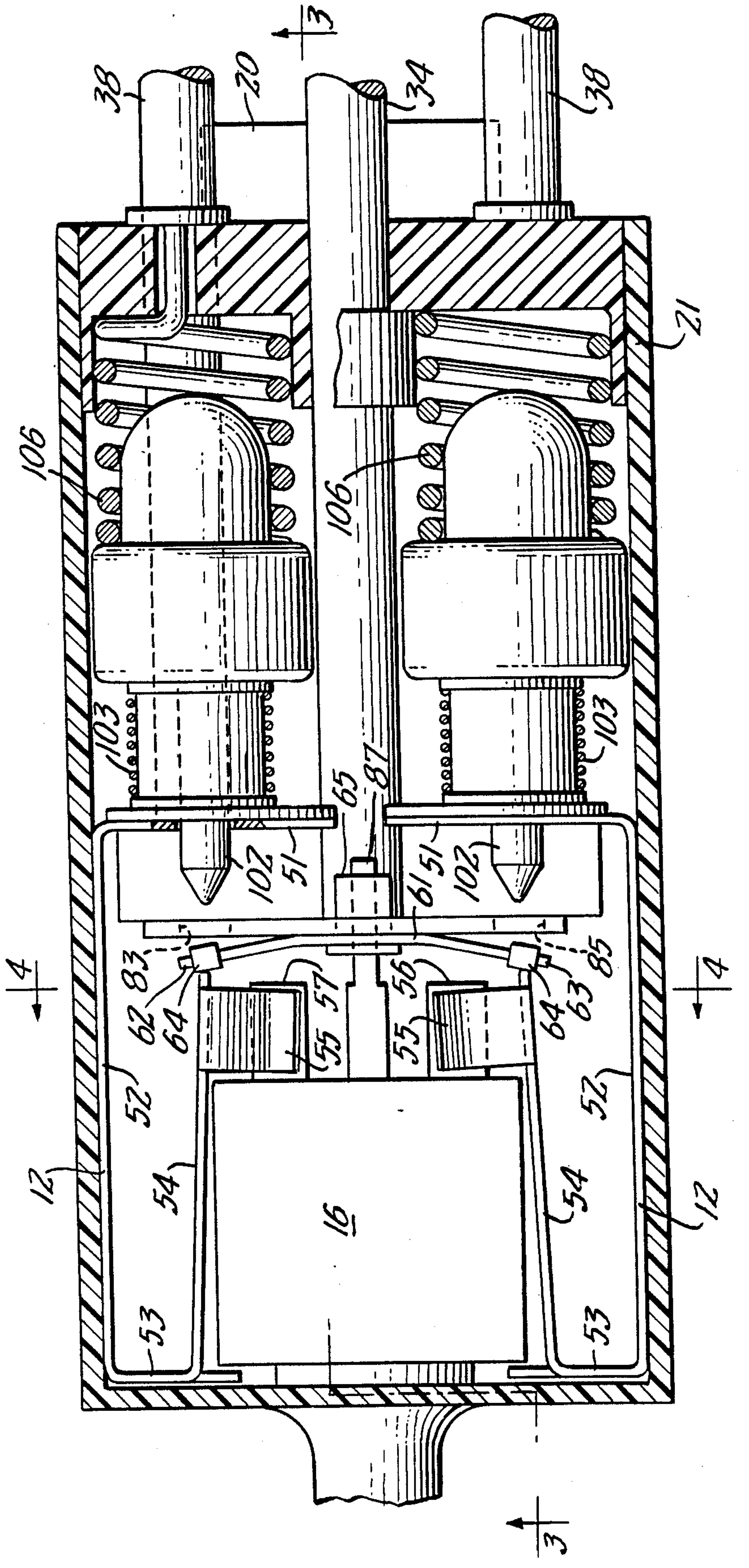
FIG. 2 is a fragmentary longitudinal sectional view of the embodiment, as seen from the plane 2—2 in FIG. 3.

It will be observed that despite the provision of a relatively large number of components, the module may be assembled with relative ease by workers possessing only ordinary skills. The chip element 16 is first engaged with both test point contact elements 12. At this point, the heat coil assemblies 17 are positioned in the shell element 21, and the long elements 13 are engaged on the grounding pin members 102. Next, the fail-safe contact element 13 and the ground contact element 15 are assembled as shown in FIGS. 2 and 3 with the ground pin 39 which has been previously seated in the base element 20 with the ground lead 93 positioned between the tab 65 and the tab 87.

The chip element 16 is now seated in the recess 36, and the base element 20 and shell element 21 assembled, the assembly being maintained by the engagement of the tabs 35 in the openings 47.

We wish it to be understood that we do not consider the invention to be limited to the precise details of structure shown and set forth in this specification, for obvious modifications will occur to those skilled in the art to which the invention pertains.

We claim:

1. An improved subscriber circuit protector module comprising: an outer housing including mating base and shell elements and having an inner surface defining a cavity; a solid state integrated circuit protector chip element having a synthetic resinous casing, and having tip, ring, and ground contacts extending outwardly therefrom; a pair of elongated test point contact elements each having a clip at one end thereof engaging one of said tip and ring contacts on said chip element, and an intermediary segment having a surface forming a test point contact accessible through an opening in said housing, and a second contact extending transversely of said cavity; a fail-safe contact including an end wall, first and second resilient members extending therefrom and having free ends each having a fusable insulated sleeve thereon, each end resiliently contacting a conductor leading to one of a tip and ring contact on said chip element, said end wall having a longitudinally extending resilient grounding tab, and an opening for engagement with a ground pin on said housing; a pair of U-shaped long contact elements each having a first orificed end interconnected by an elongated segment; a ground contact element including a ground plane member having resilient tabs extending longitudinally therefrom, an elongated segment extending longitudinally therefrom in an opposite direction from that of said tab, and a transversely oriented end wall, said ground contact element partially surrounding said chip element; said first and second mentioned tabs resiliently contacting said ground contact on said chip element; a plurality of heat coil assemblies, each having a resiliently urged ground pin member for engaging said ground plane member, each of said second orificed terminals of said test point contact elements surrounding a respective ground pin member, said first orificed end of each of said long contacts also surrounding a respective ground pin member, each of said second orificed ends thereof communicating with one of a plurality of tip out pins extending outwardly of said housing; said chip element providing momentary current surge protection to a protected circuit, said heat coil assemblies providing continuous excess current protection, and said fail-safe contact providing tertiary protection in the event of heat coil assembly failure.

2. An improved subscriber circuit protector module in accordance with claim 1, further characterized in said base element of said housing forming a recess extending from an inner end surface thereof, said chip element being at least partially engaged within said recess.

3. An improved subscriber circuit protector module in accordance with claim 1, further characterized in said ground contact element surrounding said chip element and having a terminal member thereon engaged in said recess in base element.

* * * * *